Feb. 2, 1965 N. L. CULL ETAL 3,168,586
TREATMENT OF POLYMERS PRODUCED BY ALKALI-METAL
CATALYZED POLYMERIZATION
Filed Aug. 7, 1962 2 Sheets-Sheet 1

POLYMER CENTRIFUGATION

EFFECT OF WATER ADDITION ON POLYMER LOSSES

3,168,586
TREATMENT OF POLYMERS PRODUCED BY ALKALI-METAL CATALYZED POLYMERIZATION

Neville Leverne Cull, Baker, and Joseph Earl Landry, Jr., Harry Edwin Robson, and Raymond Carroll Lohman, Baton Rouge, La., and Murray Nadler, Morristown, and Herschel T. White, Montclair, N.J., assignors to Esso Research and Engineering Company, a corporation of Delaware
Filed Aug. 7, 1962, Ser. No. 215,419
5 Claims. (Cl. 260—680)

This invention relates to the treatment of polymers produced by alkali metal catalyzed polymerization.

The polymerization of diolefins in the presence of alkali metals, such as sodium, potassium, lithium, rubidium or caesium in the presence of a solvent and an ether promoter is well known. Liquid polymers are prepared by operating at slightly elevated temperatures, using small amounts of very finely divided catalyst in the presence of a hydrocarbon diluent such as benzene, naphtha (boiling 90 to 120° C.), straight run mineral spirits (boiling 150 to 200° C.), butane, pentane, toluene, xylene, etc.

It is necessary to treat the resulting reaction product in some manner to remove the alkali metal, reactive alkali metal organic compounds and gel components present to obtain a colorless, haze-free product which will form films free from imperfections. The alkali metals and alkali metal compounds are harmful if left in the product because they promote crosslinking of the polymer with resultant formation of gel. A liquid polymer which is to be used as a drying oil should not contain any substantial amount of alkali metal or alkali metal compounds as these tend to render the product cloudy and cause undesirable reactions when using these oils in paints, varnishes and other protective surface coatings. The presence of gel causes imperfections in films used in such applications.

It has been previously proposed to remove the alkali metals by washing the reaction product with water, neutralizing them with alcohol or dilute acids or by contacting the reaction product with adsorbent clays and filtering. The washing and neutralizing techniques are attendant with many difficulties. Emulsions may form which are difficult to break and large quantities of acidified water fail to remove all the gel and when films are formed from the finished product, the films "eyehole" badly due to the presence of the gel. The treatment with clay results in a satisfactory product but the equipment necessary is a large part of the plant inventory and consequently a more economical process is highly desirable.

It has now been found that the above difficulties can be overcome and a finished product obtained which contains no gel or residual alkali metals and which is cheap and simple to operate by the following seriatim steps, although some of these steps may be omitted or reversed:

(1) Neutralizing the reaction product with 1.1 to 4.0 moles of water per mole of alkali metal in the presence of the ether promoter.

(2) Soaking the reaction product at temperatures of 40–70° C. for from 5 minutes to 2 hours to agglomerate the sludge.

(3) Diluting the heat-soaked product to 15–20% NVM with recycled diluent.

(4) Separating the sludge from the heat-soaked product by centrifuging or settling.

(5) Contacting the centrifuged or settled product with a bed of adsorbent clay to remove final traces of gel and alkali metal.

The invention is particularly applicable to the treatment of liquid diolefin polymers prepared in accordance with the process claimed in U.S. No. 2,791,618, issued May 7, 1957, in the name of James E. Moise et al. It is applicable to polymers of conjugated diolefins such as 1,3-butadiene; isoprene; 2,3-dimethyl-1,3-butadiene; and the like, alone or in admixture with each other and/or other monomers copolymerizable therewith such as styrene or other vinyl aromatic hydrocarbon. The polymerization is carried out in a hydrocarbon reaction diluent at a temperature ranging from 25 to 105° C., preferably between 40 and 85° C., either batchwise or in a continuous process. Materials used as diluents in the polymerization are inert hydrocarbons which remain liquid under the reaction conditions employed. These diluents are employed in amounts ranging from 50 to 500, preferably 100 to 200, parts per 100 parts of monomers.

It is usual to employ about 10–40 parts of an ether promoter per 100 parts of monomers. Suitable ethers include dioxane, diethyl ether, tetrahydrofuran and the like.

According to the present invention the effluent from the polymerization zone comprising liquid polymer or copolymer dissolved in hydrocarbon solvent, ether promoter and free alkali metal catalyst is contacted with 1.1 to 2.0 moles of water per mole of alkali metal present in the polymer solution to neutralize the catalyst and precipitate alkali metal hydroxide. The neutralization also reduces the gel content of the polymer from 15–20% by volume to as low as 0.2% by volume. This reduction is due apparently to the releasing of sodium from the polymer chains. The more water that is added at this point the less is the amount of gel obtained, and the amount of polymer lost in the subsequent separation of sludge. However, if significant amounts of free water remain after neutralization, the ether promoter is extracted from the polymer solution by the free water and is lost. The amount of sodium carried over into the final product is increased as the amount of water is increased however. It is important, therefore, to maintain the amount of water within the limits set forth above.

The neutralized product is diluted to 15–20% NVM with a mixture of polymerization diluent and ether recycled from the process and heated to a temperature between 40 and 70° C., preferably 50–60° C., for from five minutes to two hours, preferably 15–30 minutes. This heat treatment tends to agglomerate the gel and enable it to be removed by subsequent treatment.

The heat-soaked product is then separated from the agglomerated gel and solid sodium hydroxide by centrifuging or settling. Centrifuging may take place in any type of conventional centrifuge but the disc type is highly satisfactory. Alternatively the gel may be separated by gravity settling at ambient temperature. A suitable settling means is a large drum providing at least 24 hours holdup. The polymer solution overflows from the top of the drum and the concentrated gel slurry is pumped out the bottom.

The substantially gel- and alkali metal-free polymer solution is sometimes yellow in color, hazy and may contain a small trace of gel particle which would cause imperfections in surface coating applications. Therefore the polymer solutions may be given a final treatment by passing it through a bed of adsorbent clay, such as fuller's earth or attapulgus to remove the color and last traces of gel. The polymer effluent is then stripped free of diluent and again filtered, if desired, through a non-adsorbent material. The product is colorless and free from gel.

The clay bed is regenerated periodically, in situ, with hot naphtha. About nine to twenty weights of polymer per weight of clay can be treated before regeneration is required. Valuable diluent and polymer left in the bed are recovered by flushing the bed with cold naphtha before regenerating or discarding the bed.

The process can be more easily understood by consideration of the accompanying drawings in which.

Figure 1:
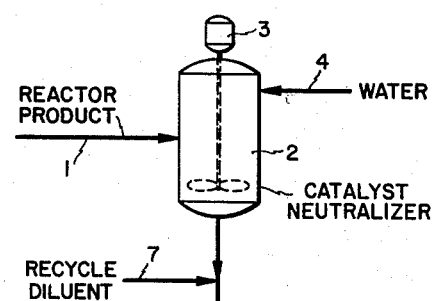
FIGURE 1 is a diagrammatic representation of one embodiment of the process in which the gel and alkali metal hydroxides are separated from the polymer solution by centrifugation.
Figure 1:
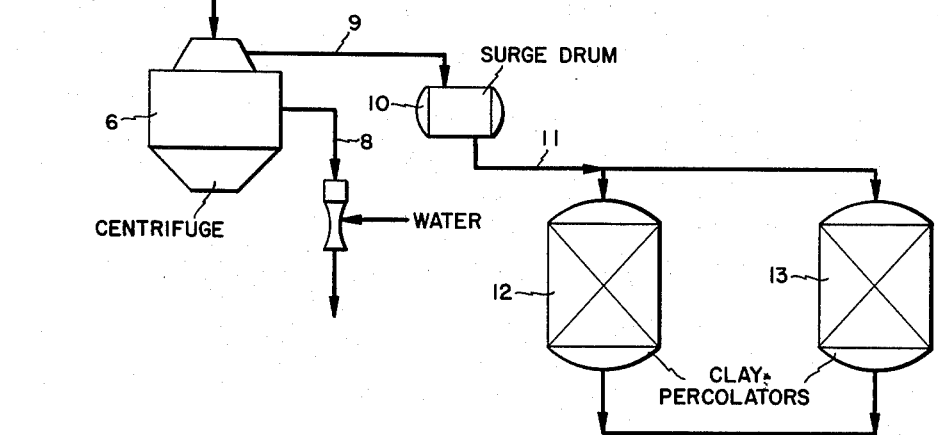

Referring now to FIGURE 1, a hydrocarbon solution of a polymer of a diolefin such as butadiene or a copolymer of the diolefin with a vinyl aromatic hydrocarbon such as styrene flowing in line 1 and containing alkali metal, alkali metal compounds, 10–40 parts by weight of an ether per 100 parts of monomers originally charged to the polymerization process is introduced into vessel 2, equipped with stirrer 3. An amount of water equal to about 1.1 to 2.0 moles per moles of alkali metal catalyst present is charged to this vessel through line 4. This water reacts with all of the alkali metal present, leaving very little free water to contaminate the product. The amount of water used, based on the volume of polymer solution, is only about 0.006 volume. Thus significant amounts of alkali metal salts are not extracted into a discrete water phase if the amount of water does not exceed 2.0 moles per mole of sodium. It is essential that this neutralization step take place in the presence of the ether promoter. The ether is necessary to act as a mutual solubilizer, allowing good contact of the water with the reactor product. The time of contact between the water and the polymer solution in vessel 2 may vary from five minutes to two hours, with the preferred time ranging from fifteen minutes to two hours. The temperature is maintained between 40 and 70° C. By increasing the temperature the residence time can be substantially reduced.

After leaving neutralizing vessel 2, the polymer solution is passed by line 5 to centrifuge 6. This may be of any conventional type such as a disc centrifuge. Prior to entering the centrifuge the polymer solution is preferably diluted to 15–20% NVM by the addition of recycle hydrocarbon diluent and ether promoter through line 7 in order to decrease polymer losses. Water and sludge consisting of gel and alkali metal hydroxide are removed to the sewer through line 8.

Gel- and alkali metal-free polymer product leaves the centrifuge through line 9 and passes to surge drum 10, thence by line 11 to clay percolator drums 12 and 13 arranged in parallel. These drums are filled with an adsorbent material such as attapulgus clay, fuller's earth, activated carbon and the like. These percolators remove the last traces of color bodies and gel and are necessary if the final product is to meet color and film-forming specifications. The final product is withdrawn to storage through line 14.

Figure 2:
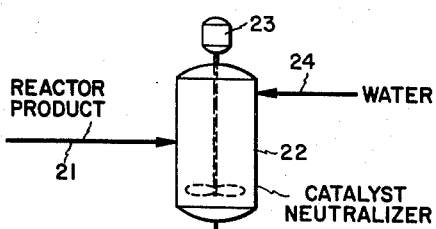
FIGURE 2 is a similar schematic representation in which the separation is accomplished by settling.
Figure 2:
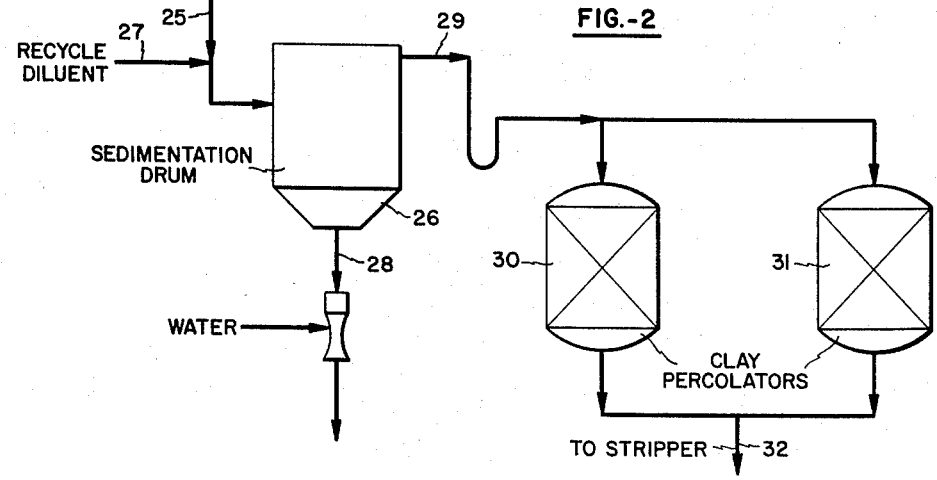

Referring now to FIGURE 2 an alternative embodiment is shown in which the centrifuge is replaced by a drum settler.

In this embodiment reactor product flowing in line 21 is passed to vessel 22 having stirrer 23 where it is contacted with water as described in connection with vessel 2 of FIGURE 1. From neutralizer 2 the product passes by lines 25 to settler 26 after being diluted to 15–20% NVM by recycled diluent and ether from line 27. In settler 26 the product settles into two phases, a lower gel phase containing alkali metal hydroxide which is removed through line 28 and an upper polymer phase which is drawn off by line 29 direct to clay percolators 30 and 31 which are the counterpart of drums 12 and 13 of FIGURE 1. Gel and alkali metal-free product is withdrawn through line 32.

Obviously this process can be operated batchwise or can be operated as a continuous process. The size of the various vessels is not critical but it is important that means be provided for vigorous agitation in vessels 2 and 22. Heating is likewise necessary in these zones.

The use of only slightly more than the stoichiometric amount of water in vessels 2 and 22 followed by adequate separation of the phases either by centrifuging or by prolonged settling and, if desired, by clay treatment by the purified product enables a water-white product meeting color and film-forming specifications to be obtained.

The following examples are offered to illustrate certain features of the invention but without intention of limiting the invention thereto.

*Example I*

A butadiene-styrene copolymer was prepared in a five-stage commercial continuous process. The monomers, diluents, catalyst, etc., were continuously added to the first stage in the following proportions.

| | Parts by weight |
|---|---|
| Butadiene | 80 |
| Styrene | 20 |
| Naphtha | 200 |
| Dioxane | 40 |
| Isopropanol | 0.2 |
| Sodium | 1.5 |

The polymerization was carried out at 50° C. Product flowed from stage to stage and was withdrawn from the last stage.

This product was contacted with various amounts of water and diluted with a mixture of naphtha and dioxane in the proportion used in the synthesis process and centrifuged. The following data were obtained.

| Moles $H_2O$/mole Na | Percent NVM After Dilution | Polymer Losses on Centrifuging, Percent of Feed | Na in Prod. (p.p.m.) | Gel in Prod. | Color |
|---|---|---|---|---|---|
| None | 15 | 19.5 | 17 | Trace | 1 |
| 0.8 | 17 | 9.0 | ------ | ------ | --- |
| 1.5 | 12 | 2.0 | 93 | Trace | 2+ |
| 3.0 | 12 | 1.5 | 103 | Trace | 3 |

*Example II*

Polybutadiene was prepared in the same manner as described in Example I for the preparation of the copolymer, the only difference being the styrene was omitted. The product was neutralized with various amounts of water after dilution as described in Example I and finally centrifuged. The following data were obtained.

| Neutralization Moles $H_2O$/Mole Na | Percent NVM After Dilution | Polymer Losses on Centrifuging, Percent of Feed | Na in Prod. (p.p.m.) | Color |
|---|---|---|---|---|
| None | 17 | ------ | ------ | --- |
| 1.6 | 17 | 5.5 | 84 | 3 |
| 2.6 | 17 | 2.4 | 115 | 5 |

*Example III*

Both polybutadiene and the copolymer of butadiene and styrene were prepared batchwise using substantially the same recipe as described in Examples I and II. The products were neutralized with various amounts of water, dilute as in Examples I and II and centrifuged. The following data were obtained:

| Polymer | Moles H₂O/Mole of Sodium | Percent NVM after Dilution | Polymer Losses on Centrifuging, Percent of feed |
|---|---|---|---|
| Copolymer | 1.0 | 15 | 5.8 |
| Do | 2.5 | 15 | 2.4 |
| Do | 4.0 | 15 | 0.8 |
| Do | 5.5 | 15 | 0.7 |
| Polybutadiene | 2.0 | 35 | 6.0 |
| Do | 4.0 | 35 | 1.8 |

Figure 3:
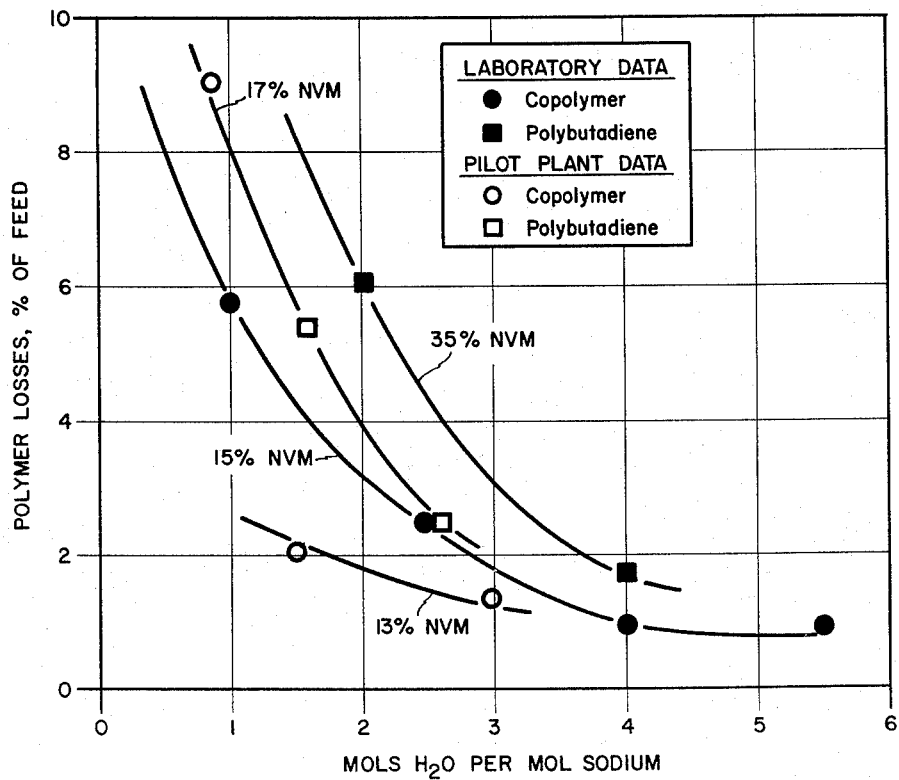
FIGURE 3 is a correlation of the relationship between polymer losses and the amount of water in the neutralization.

The data of Examples I–III were plotted to show the relationship between polymer losses obtained on centrifuging and the amount of water used in neutralizing the product. This correlation is shown in FIGURE 3. It will be noted that the polymer losses are drastically reduced by increasing the amount of water up to four moles per mole of sodium in the product. However, the use of more than four moles of water yields no significant improvement and there is danger of running into emulsion problems as the water is increased. For these reasons the amount of water to be used for neutralizing the sodium should be between 1.1 and four moles per mole of sodium to be neutralized. However, the data also show that as the water is increased, the amount of sodium that is retained in the product is also increased. Since commercial specifications call for no more than 100 p.p.m. of sodium in the product and since this limit is reached at about 2 moles of water per mole of sodium, it is preferred to use between 1.5 and 2 moles of water per mole of sodium to be neutralized.

*Example IV*

Butadiene was polymerized in several runs with styrene in a batch process using the same proportions given in Example I and the products were neutralized with 1.5 moles of water per mole of sodium, diluted to 15 wt. percent NVM by means of recycle diluent containing dioxane, centrifuged and finally passed through a column of fuller's earth 13 inches high and 1.5 inches in diameter. The resulting product was laid down in films on steel panels and cured by baking.

The following data were obtained:

| Feed | Product | | | | | |
|---|---|---|---|---|---|---|
| | After Centrifuging | | | After Clay Percolation | | |
| | Na (p.p.m.) | Color | Eyeholes in film | Na (p.p.m.) | Color | Eyeholes in film |
| Run A | 28 | 2–3 | 0 | 0 | 1 | 0 |
| Run B | 150 | 2 | 0 | 0 | 1 | 0 |
| Run C | 196 | 2 | 0 | 0 | 1 | 0 |
| Run D | 5,660 | 2–3 | 0 | 0 | 1 | 0 |

The above data indicate that centrifuging yields a borderline acceptable product with regard to color and sodium level, but a product with good non-eyeholing characteristics. However, centrifugation followed by clay percolation always yields a product of excellent quality.

*Example V*

Three samples of the batch synthesis copolymer prepared as in Example II were each neutralized with 1.1 to 1.5 moles of water per mole of sodium. One was stripped to remove dioxane and then washed with equal volumes of acidified water to wash out the precipitated sodium hydroxide and settled as described in Serial No. 101,282, filed April 6, 1961, now abandoned. Another was diluted to 15 wt. percent NVM by the addition of a mixture of naphtha and dioxane in the same proportions as in the synthesis and and then heated to a temperature of 60° C. for about 15 minutes. The third sample was centrifuged to separate precipitated caustic, diluted to 1.5% NVM with naphtha and heat soaked for 15 minutes at 66° C.

Each of the treated samples were finally filtered, stripped to 98% NVM and rediluted to 50% NVM with naphtha and analyzed for sodium and color. Films were also laid down on steel panels and baked, after which the number of eyeholes per panel were determined. The following results were obtained:

| Sample | 1 | 2 | 3 |
|---|---|---|---|
| Film Quality (eyeholes) | 35 | 0 | 0 |
| Sodium, p.p.m. (product) | | 90 | 0 |
| Color (Gardner) (product) | | ¹1 | ¹1 |
| Sodium (feed) | 17,000 | 17,000 | 552 |

¹ At 50% NVM.

*Example VI*

A sample of the product from batch synthesis described in Example II was neutralized with 1.1 moles of H₂O per mole of sodium, diluted to 15% NVM with a naphtha-dioxane mixture and settled for three hours. It was then decanted and percolated through calcined fuller's earth. The column of clay plugged after less than 1 gram of polymer per gram of clay had passed through the column. The percolated material was then stripped to 98% NVM and rediluted with naphtha. Film tests showed more than 100 eyeholes per panel.

Another sample of the same product was diluted to 15 wt. percent with naphtha-dioxane mixture, heated for 30 minutes at 150° F. and subsequently filtered and stripped to 98% NVM and rediluted to 50% NVM with naphtha and analyzed for sodium, color and film characteristics. The following data were obtained.

Film quality (eyeholes) _____ 0.
Sodium (p.p.m.) (product) _____ 193.
Color _____ 1.0 at 98% NVM.
Sodium (p.p.m.) (feed) _____ 6000.

The above examples show that alkali metal catalysts can be completely eliminated from liquid polymers produced by alkali metal polymerization by neutralizing the alkali metal with a small excess of water over that theoretically necessary to react with all of the sodium present in the product followed by centrifuging the neutralized product and percolating the centrifuged product through an adsorbent material. The data in the examples show that centrifuging alone is insufficient to remove the sodium without excessive polymer losses (Example I). Neutralization followed by centrifuging yields a product with good film-forming characteristics but still contains significant amounts of sodium. Subsequent percolation through clay removes this sodium and improves color.

Example V shows that a combination of water neutralization, centrifuging and heat soaking results in a product which is free of sodium and yields baked films having no eyeholes.

Example VI shows that a combination of water neutralization and heat soaking will produce a sodium and gel-free product while a combination of water neutralization and clay percolation will not.

Thus the present invention resides in a combination of substantially stoichiometric water neutralization of sodium in combination with centrifugation and clay percolation or heat soaking.

The nature of the present invention having been thus fully set forth and specific examples of the same given, what is claimed as new and useful and desired to be secured by Letters Patent is:

1. In a process for polymerizing conjugated diolefins in the presence of an alkali metal catalyst, polymerization solvent and ether promoter in which the polymerization solvent and ether promoter are separated from the product and recycled to the polymerization step, the method for separating the alkali metal catalyst from the solution of polymer in polymerization solvent and ether promoter, the improvement which comprises contacting the solution of polymer in polymerization solvent and ether promoter with 1.1 to 2.0 moles of water per mole of alkali metal in said polymer solution at a temperature between 50 and 60° C. for a period of time between 15 and 30 minutes to convert the alkali metal to alkali metal hydroxide, diluting the polymer solution to 15–20 wt. percent NVM with the recycle mixture of polymerization solvent and ether promoter, heating the dilute product to a temperature between 40 and 70° C. for from five minutes to two hours, and separating the alkali metal hydroxide from the diluted polymer solution.

2. The process of claim 1 in which the alkali metal is sodium and the ether is dioxane.

3. The process of claim 1 in which the alkali metal hydroxide is separated by centrifuging.

4. In a process for polymerizing conjugated diolefins in the presence of an alkali metal catalyst, polymerization solvent and ether promoter in which the polymerization solvent and ether promoter are separated from the product and recycled to the polymerization step, the method for separating the alkali metal catalyst from the solution of polymer in polymerization solvent and ether promoter, the improvement which comprises contacting the solution of polymer in polymerization solvent and ether promoter with 1.1 to 2.0 moles of water per mole of alkali metal in said polymer solution at a temperature between 50 and 60° C. for a period of time between 15 and 30 minutes to convert the alkali metal to alkali metal hydroxide, diluting the polymer solution to 15–20 wt. percent NVM with the recycle mixture of polymerization solvent and ether promoter, separating the alkali metal hydroxide from the diluted polymer solution by centrifugation and contacting the alkali-metal free polymer solution with adsorbent clay and recovering a colorless, gel and alkali metal-free polymer which has excellent film-forming characteristics.

5. The process of claim 4 in which the alkali metal is sodium and the ether is dioxane.

References Cited in the file of this patent
UNITED STATES PATENTS

| | | |
|---|---|---|
| 2,631,175 | Crouch | Mar. 10, 1953 |
| 2,712,561 | Gleason | July 5, 1955 |
| 2,762,851 | Gleason | Sept. 11, 1956 |